United States Patent [19]

Yasumura et al.

[11] Patent Number: 4,882,632
[45] Date of Patent: Nov. 21, 1989

[54] COLOR VIDEO SIGNAL REPRODUCING APPARATUS USING FREQUENCY CONVERTED CHROMINANCE SIGNAL

[75] Inventors: Hiroto Yasumura; Masahide Hirasawa; Minoru Noji, all of Kanagawa; Susumu Kozuki, Tokyo; Koji Takahashi; Katsuji Yoshimura, both of Kanagawa, all of Japan

[73] Assignee: Canon Kabushiki Kaisha, Tokyo, Japan

[21] Appl. No.: 111,361

[22] Filed: Oct. 21, 1987

[30] Foreign Application Priority Data

Oct. 27, 1986 [JP] Japan .................................. 61-255121

[51] Int. Cl.$^4$ ............................................. H04N 9/83
[52] U.S. Cl. ................................................. 358/330
[58] Field of Search ..................... 358/310, 330, 12, 14, 358/15, 16

[56] References Cited

U.S. PATENT DOCUMENTS

| 4,520,385 | 5/1985 | Jackson et al. | 358/330 |
| 4,558,348 | 12/1985 | Bolger et al. | 358/320 |
| 4,661,841 | 4/1987 | Suzuki | 358/27 |
| 4,668,997 | 5/1987 | Nagano et al. | 358/330 |
| 4,725,894 | 2/1988 | Sasaki et al. | 358/330 |
| 4,746,992 | 5/1988 | Hashimoto et al. | 358/330 |

Primary Examiner—Donald McElheny, Jr.
Attorney, Agent, or Firm—Robin, Blecker, Daley & Driscoll

[57] ABSTRACT

The present invention is directed to a reproducing apparatus for reproducing a composite signal from a record bearing medium on which said composite signal is recorded, said composite signal being formed by frequency multiplexing a frequency-modulated luminance signal and a low-band converted carrier chrominance signal which is obtained by frequency-converting a carrier chrominance signal from a high frequency band to a low frequency band. The recording apparatus is constructed to separate the frequency-modulated luminance signal and the low-band converted carrier chrominance signal from the composite signal reproduced from said record bearing medium, to demodulate the frequency-modulated luminance signal to restore the luminance signal, to convert the low-band converted carrier chrominance signal into two kinds of color difference signals and to form R, G and B signals from the luminance signal and the two kinds of color-difference signals thus obtained. According to this construction, it is possible to form and output the R, G and B signals, without causing deterioration of signals.

5 Claims, 1 Drawing Sheet

COLOR VIDEO SIGNAL REPRODUCING APPARATUS USING FREQUENCY CONVERTED CHROMINANCE SIGNAL

BACKGROUND OF THE INVENTION

1. Field of the Invention

This invention relates to a color video signal reproducing apparatus for reproducing a color video signal from a record bearing medium.

2. Description of the Related Art

Heretofore, a color video signal has been recorded or reproduced, for example, by a camera-combined type video tape recorder which is capable of performing a reproducing operation (hereinafter referred to as the camera-combined type VTR) in the following manner: In recording, a luminance signal Y and color difference signals R-Y and B-Y are obtained by a matrix circuit from R (red), G (green) and B (blue) signals which are obtained by a camera part of the camera-combined VTR; varied processes such as preemphasis process, etc. are performed on the luminance signal Y; and, after that, the signal Y is frequency modulated. Meanwhile, the color difference signals R-Y and B-Y are quadrature two-phase modulated into a carrier chrominance signal; and, after that, the frequency of the carrier chrominance signal is converted into a low band to obtain a low-band converted carrier chrominance signal. The frequency modulated luminance signal and the low-band converted carrier chrominance signal are frequency multiplexed into a recording signal. The recording signal is then recorded by a rotary head on a magnetic tape which is used as a record bearing medium.

In the case of a reproducing operation, a reproduced signal is obtained from the magnetic tape by the rotary head. A low-pass filter and a band-pass filter are used for separating from the reproduced signal the frequency modulated luminance signal and the low-band converted carrier chrominance signal. The frequency modulated luminance signal is demodulated into the original luminance signal. The low-band converted carrier chrominance signal is frequency converted into the original carrier chrominance signal. The luminance signal and the carrier chrominance signal are multiplexed and produced as a reproduced video signal.

The conventional camera-combined type VTR which operates as described above is arranged to supply a monitor device such as a TV set with a reproduced video signal for reproducing a recorded image. In that instance, the VTR produces the reproduced video signal in the form of a reproduced composite signal, which is obtained by multiplexing the luminance signal and the carrier chrominance signal within the camera-combined type VTR. Then, within the monitor device, the luminance signal and the carrier chrominance signal are again separated from the reproduced composite signal. However, the quality of the reproduced image is greatly deteriorated by the separating process performed, within the monitor device, on the composite signal which has undergone a composing process.

Meanwhile, it has recently become popular to provide a monitor device with R, G and B signal input terminals for compatibility with such an apparatus as a personal computer or the like that is capable of producing R, G and B signals as a video signal. However, since the conventional VTR is arranged to have an external device (or the monitor device) convert the reproduced composite signal back into the R, G and B signals as mentioned in the foregoing, it has been impossible to obtain a reproduced image of a sufficiently high quality even when a monitor device is provided with the R, G and B signal input terminals because of the above stated signal deterioration resulting from the separating and converting processes to be performed on the reproduced composite signal within the external device or the monitor device.

SUMMARY OF THE INVENTION

A general object of this invention is to provide a color video signal reproducing apparatus which is capable of solving the above stated problems of the prior art.

A more specific object of this invention is to provide a color video signal reproducing apparatus which is capable of obtaining reproduced R, G and B signals from a reproduced color video signal without deteriorating the signal despite of simple structural arrangement thereof.

Under this object, a color video signal reproducing apparatus arranged as an embodiment of this invention to reproduce from a record bearing medium a color video signal which is formed by frequency multiplexing at least a luminance signal and a low-band converted carrier chrominance signal comprises: reproducing means for reproducing the color video signal from the record bearing medium; separating means for separating the luminance signal and the low-band converted carrier chrominance signal from the color video signal reproduced by the reproducing means; conversion means arranged to convert the low-band converted carrier chrominance signal separated by the separating means into a base band signal and to produce the base band signal; and R, G and B signal generating means for generating R, G and B signals by using the luminance signal separated by the separating means and the base band signal produced from the conversion means.

Another object of this invention is to provide a color video signal reproducing apparatus which is capable of processing the color signal in a simple manner.

Under that object, a color video signal reproducing apparatus arranged as another embodiment of this invention to reproduce from a record bearing medium a color video signal which is formed by frequency multiplexing at least a luminance signal and a low-band converted carrier chrominance signal comprises: reproducing means for reproducing the color video signal from the record bearing medium; separating means for separating the luminance signal and the low-band converted carrier chrominance signal from the color video signal reproduced by the reproducing means; color difference signal forming means arranged to form color difference signals from the low-band converted carrier chrominance signal separated by the separating means and to produce the color difference signals; signal processing means for processing the color difference signals formed by the color difference signal forming means; and R, G and B signal generating means for generating R, G and B signals by using the luminance signal separated by the separating means and the color difference signals processed by the signal processing means.

The above and other objects and features of the invention will become apparent from the following detailed description of an embodiment thereof taken in connection with the accompanying drawing.

DETAILED DESCRIPTION OF THE PREFERRED EMBODIMENT

Figure 1:
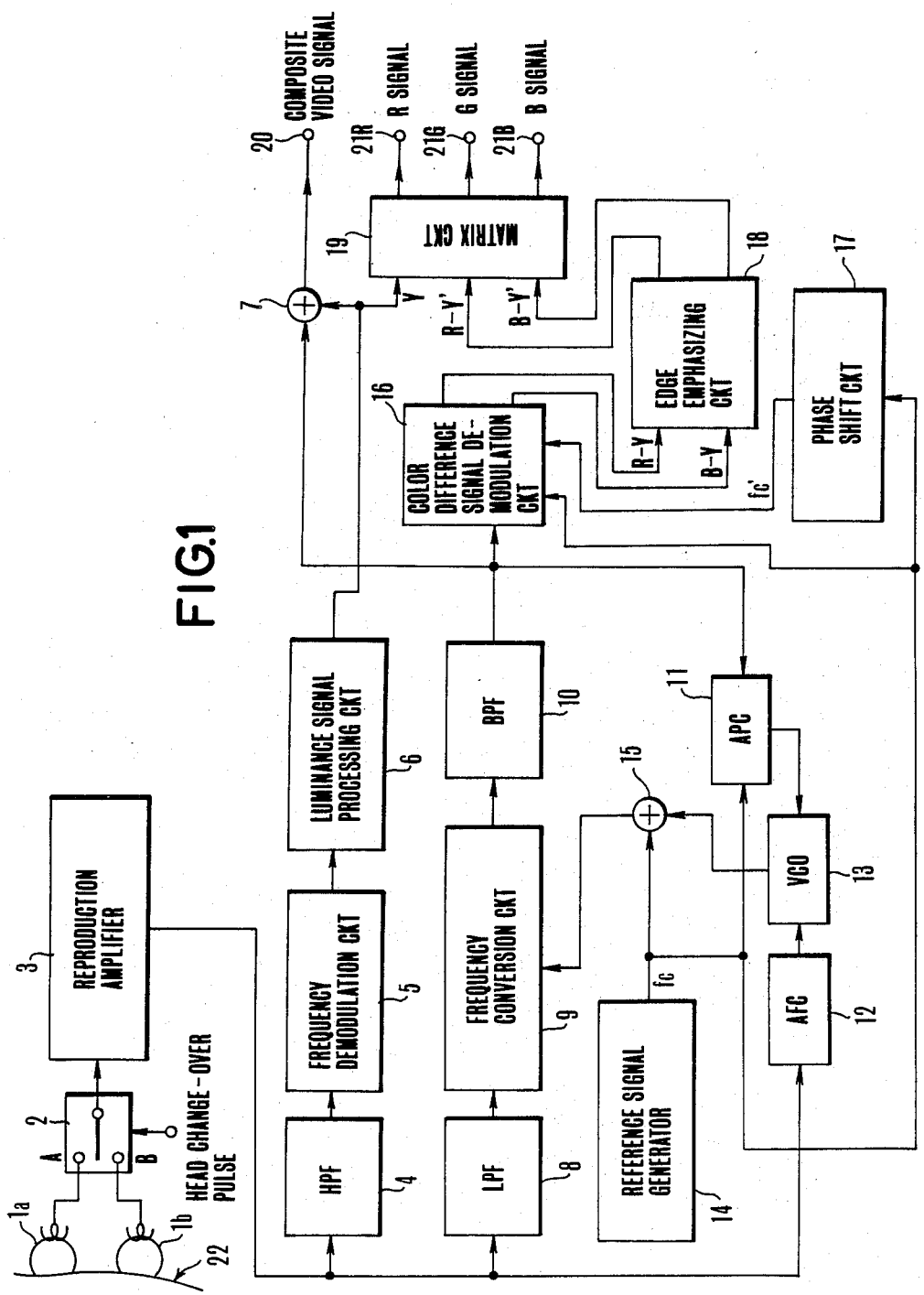
FIG. 1 is a block diagram showing in outline the arrangement of the reproduction system of a VTR to which this invention is applied as an embodiment thereof.

This invention is further described through an embodiment thereof as follows: FIG. 1 shows in outline the arrangement of the reproduction system of a VTR to which this invention is applied as an embodiment thereof.

Referring to FIG. 1, the illustration includes magnetic heads 1a and 1b; a head change-over switch 2; a reproduction amplifier 3; a high-pass filter 4 (hereinafter referred to as HPF) which is arranged to separate a reproduced frequency modulated luminance signal from a reproduced video signal; a frequency demodulation circuit 5; a luminance signal processing circuit 6; a mixer 7 which is arranged to multiplex the luminance signal and a carrier chrominance signal; a low-pass filter 8 (hereinafter referred to as LPF) which is arranged to separate a low-band converted carrier chrominance signal from the reproduced video signal; a frequency conversion circuit 9 which is arranged to convert the low-band converted carrier chrominance signal separated by the LPF 8 into an ordinary carrier chrominance signal; a band-pass filter 10 (hereinafter referred to as BPF); an automatic phase control circuit 11 (hereinafter referred to as APC) which is arranged to control the phase of the signal output of a voltage controlled oscillator 13 (hereinafter referred to as VCO); an automatic frequency control circuit 12 (hereinafter referred to as AFC) which is arranged to control the frequency of the signal output of the oscillator 13; a reference signal generator 14; a mixer 15; a color difference signal demodulation circuit 16 which is arranged to convert the output of the BPF 10 into color difference signals; a phase shift circuit 17 which is arranged to shift 90 degrees the phase of a reference signal generated by the reference signal generator 14; an edge emphasizing circuit 18 which is arranged to perform an edge emphasizing process by using the color difference signals produced from the color difference signal demodulation circuit 16; a matrix circuit 19 which is arranged to receive the luminance signal processed by the luminance signal processing circuit 6 and the color difference signals produced from the edge emphasizing circuit 18 and to convert them into R, G and B signals; a composite video signal output terminal 20; output terminals 21R, 21G and 21B which are arranged to produce the R, G and B signals respectively, and a magnetic tape 22.

The arrangement shown in FIG. 1 operates as follows: The reproduced signal which is reproduced by the magnetic heads 1a and 1b from the magnetic tape 22 is supplied to the change-over switch 2. The magnetic heads 1a and 1b are rotary heads. Change-over pulses are generated according to the rotation period of the magnetic heads 1a and 1b at a pulse generating frequency which is, for example, 60 Hz in the case of the TV signal of the NTSC color system. The connecting positions A and B of the change-over switch 2 are changed from one over to the other (see FIG. 1). The signal portions reproduced by the magnetic heads 1a and 1b are then alternately supplied via the switch 2 to the reproduction amplifier 3. The signal amplified by the amplifier 3 is supplied to the HPF 4, LPF 8 and AFC 12. At the HPF 4, the luminance signal which is distributed within a high frequency band part of the reproduced signal is separated to be supplied to the frequency demodulation circuit 5. The circuit 5 demodulates the luminance signal. The demodulated luminance signal is supplied to the luminance signal processing circuit 6 to undergo a reproduced luminance signal processing action which is carried out in a known manner. The luminance signal thus processed is supplied to the mixer 7. Meanwhile, the low-band converted carrier chrominance signal which is located within a low frequency band part of the reproduced signal is separated by the LPF 8 and is converted into an ordinary carrier chrominance signal by the frequency conversion circuit 9.

During the converting action of the frequency conversion circuit 9, the embodiment operates in the following manner: At the time of conversion, the VCO 13 is controlled by the AFC 12 to generate a low-band converted color subcarrier signal $(fs \pm \Delta f)$ which includes a frequency deviation $(\pm \Delta f)$ resulting from time base variations arising during the reproducing process. The APC 11 detects the phase deviation of the signal which is frequency converted by the frequency conversion circuit 9 deviating from a reference signal fc which is generated by the reference signal generator 14. The VCO 13 is controlled according to the phase deviation in such a manner that: The phase of the low-band converted color subcarrier signal $(fs \pm \Delta f)$ produced from the VCO 13 is controlled to offset the phase variations of the reproduced low-band converted carrier chrominance signal $(fs \pm \Delta f)$ received at the frequency conversion circuit 9. After that, the output of the VCO 13 is mixed with the reference signal fc at the mixer 15, which then produces a signal $(fc + fs \pm \Delta f)$. The frequency conversion circuit 9 then produces a carrier chrominance signal from which a difference from the reproduced low-band converted carrier chrominance signal $(fs \pm \Delta f)$, i.e. a component representing frequency variations occurred during the reproducing process, is removed. Then, the frequency conversion circuit 9 produces a chrominance signal having as a carrier wave thereof the reference signal fc. The signal output of the circuit 9 is supplied via the BPF 10 to the color difference signal demodulation circuit 16. Further, the reference signal fc generated by the reference signal generator 14 is a color subcarrier signal which is, for example, at a frequency 3.58 MHz in the case of the TV signal of the NTSC color system. The carrier chrominance signal produced from the BPF 10 is supplied to a mixer 7 as well as the color difference demodulation circuit 16.

To the color difference signal demodulation circuit 16 are also supplied the reference signal fc generated by the reference signal generator 14 and a signal fc' which is obtained by the phase shift circuit 17 by shifting 90 degrees the phase of the reference signal fc. The circuit 16 converts the carrier chrominance signal into color difference signals R-Y and B-Y and supplies them to the edge emphasizing circuit 18. The circuit 18 performs an edge part emphasizing process on the color difference signals and produces color difference signals R-Y' and B-Y', which are supplied to the matrix circuit 19.

The luminance signal Y which is produced from the luminance signal processing circuit 6 is also supplied to the matrix circuit 19. The matrix circuit 19 obtains the R, G and B signals from the luminance signal Y and the color difference signals R-Y' and B-Y'. The R, G and B signals thus obtained are produced respectively from the output terminals 21R, 21G and 21B.

At the mixer 7, the luminance signal Y and the carrier chrominance signal (signal C) are frequency multiplexed and produced as a reproduced composite video signal from the output terminal 20.

As described in the foregoing, the embodiment is arranged to obtain the luminance signal and the color difference signals first from the signal reproduced from the magnetic tape. This arrangement obviates the necessity of carrying out a signal separating process in obtaining the R, G and B signals from the composite signal and thus enables each of the R, G and B signals to have a wide frequency band, so that the R, G and B signals can be obtained with adequate picture quality.

Further, since the embodiment is arranged to convert the carrier chrominance signal into color difference signals, the chrominance signal can be readily corrected or processed by a signal processing circuit such as the edge emphasizing circuit.

In accordance with this invention, as described in the foregoing, reproduced R, G and B signals are obtainable from the reproduced signal without deteriorating the picture quality.

What is claimed is:

1. A reproducing apparatus for reproducing a composite signal from a record bearing medium on which said composite signal is recorded, said composite signal being formed by frequency multiplexing a low-band converted carrier chrominance signal obtained by frequency-converting a carrier chrominance signal from a high frequency band to a low frequency band and a frequency-modulated luminance signal, comprising:
    (A) reproducing means for reproducing said composite signal from said record bearing medium;
    (B) separating means for separating the frequency-modulated luminance signal and the low-band converted carrier chrominance signal from the composite signal reproduced by said reproducing means and for outputting the separated signals;
    (C) frequency-demodulating means for demodulating the frequency-modulated luminance signal outputted from said separating means and for outputting the demodulated signal;
    (D) conversion means for converting the low-band converted carrier chrominance signal outputted from said separating means into two kinds of color difference signals and for outputting the converted signals; and
    (E) R, G and B signal generating means for generating R, G and B signals by using the luminance signal outputted from said frequency-demodulating means and the two kinds of difference signals outputted from said conversion means.

2. An apparatus according to claim 1, wherein said conversion means includes:
    (A) frequency conversion means for frequency converting the low-band converted carrier chrominance signal outputted from said separating means into said high frequency band, thereby restoring the carrier chrominance signal, and for outputting said carrier chrominance signal; and
    (B) color difference signal demodulating means for demodulating the two kinds of color difference signals from the carrier chrominance signal outputted from said frequency conversion means and for outputting the color difference signals.

3. An apparatus according to claim 2, further comprising color video signal forming means for forming a color video signal by frquency multiplexing the luminance signal outputted from said frequency-demodulating means and the carrier chrominance signal outputted from said frequency conversion means and for outputting said color video signal.

4. A color video signal reproducing apparatus for reproducing from a record bearing medium a color video signal which is formed by frequency multiplexing at least a luminance signal and a low-band converted carrier chrominance signal, comprising:
    (a) reproducing means for reproducing said color video signal from said record bearing medium;
    (b) separating means for separating said luminance signal and said low-band converted carrier chrominance signal from said color video signal reproduced by said reproducing means;
    (c) color difference signal forming means for forming color difference signals from said low-band converted carrier chrominance signal separated by said separating means and for producing therefrom said color difference signals;
    (d) signal processing means including emphasizing means for effecting an edge emphasizing process on said color difference signals formed by said color difference signal forming means; and
    (e) R, G and B signal generating means for generating R, G and B signals by using said luminance signal separated by said separating means and said color difference signals processed by said signal processing means.

5. An apparatus according to claim 4, wherein said R, G and B signal generating means includes a matrix circuit arranged to form said R, G and B signals from said luminance signal which is separated by said separating means and said color difference signals which are processed by said signal processing means.

* * * * *